United States Patent [19]

Claussen et al.

[11] Patent Number: 5,155,933
[45] Date of Patent: Oct. 20, 1992

[54] SPRAY SHIELD

[76] Inventors: Steven W. Claussen, R.R. 1, Benson, Minn. 56215; Robert L. Claussen, 6693 Quantico La., Maple Grove, Minn. 55369

[21] Appl. No.: 800,513

[22] Filed: Dec. 2, 1991

[51] Int. Cl.⁵ ............................................. B05B 1/20
[52] U.S. Cl. ..................................... 47/1.7; 239/175
[58] Field of Search .................... 47/1.7; 239/172, 175

[56] References Cited

U.S. PATENT DOCUMENTS

| | | |
|---|---|---|
| 556,447 | 3/1896 | Van Deusen ........................... 47/1.7 |
| 1,527,669 | 2/1925 | Camp ...................................... 47/1.7 |
| 1,669,435 | 5/1928 | Wheeler . |
| 4,736,888 | 4/1988 | Fasnacht . |
| 4,947,581 | 8/1990 | Claussen et al. . |

OTHER PUBLICATIONS

Ryan Manufacturing sales brochure.
Hiniker Company sales brochure.
Opti-Band sales brochure.

Primary Examiner—David A. Scherbel
Assistant Examiner—Joanne C. Downs
Attorney, Agent, or Firm—William L. Huebsch

[57] ABSTRACT

An elongate polymeric spray shield adapted to be connected to a support frame moved over plants growing in spaced rows from the earth to temporarily enclose the plants. The spray shield has opposite arcuate side wall portions along its axis and nozzle anchor portions along each of the side wall portions that are recessed inwardly of the spray shield from the side wall portions along which they are positioned. Each nozzzle anchor portion has a generally planar anchor part having a generally centered through opening adapted to receive a liquid outlet nozzle assembly with the axis of a nozzle in the assembly oriented at a right angle to the surfaces of the anchor part and the outlet end of the nozzle adjacent the inner surface of the side wall portion oriented at a predetermined relationship relative to the side wall portions to direct spray from the nozzle in a desired pattern.

8 Claims, 4 Drawing Sheets

SPRAY SHIELD

TECHNICAL FIELD

The present invention relates to spray shields used in spray shield assemblies adapted to be moved over row crops so as to temporarily enclose the crops when liquids or agricultural chemicals such as herbicides, insecticides or fungicides are sprayed onto them, thereby helping to insure that high percentages of the sprayed liquids are deposited on or around the plants rather than being blown away.

BACKGROUND ART

Ryan Manufacturing, Box 239, Newark, Ill. 60541 and Hiniker Company, P.O. Box 3407, Mankato, Minn. 56001 have made spray shields used in spray shield assemblies that were adapted to be attached to a frame moved over the crops or plants and that were adapted to have attached to them liquid distribution means including an inlet adapted to be coupled to a source of liquid under pressure (e.g., a liquid pumping system on a tractor to which the frame is attached), two or three liquid outlet nozzles, and means (e.g., hoses and hose connectors) for distributing liquid from the inlet to the outlet nozzles. Such spray shields have been made of a polymeric material or metal and have defined channels each opening through one side and front and rear axially spaced ends so that crops or plants can be temporarily positioned within the channel as the spray shield is moved over them.

U.S. Pat. No. 4,947,581 describes a spray shield assembly that provides adjustment to adapt the location of the liquid spray sources within the spray shield to the size or shape of the crops being sprayed. That spray shield assembly includes a polymeric spray shield (e.g., a spin or rotary molding of polyethylene) including a leading portion that converges axially from adjacent the front end toward the rear end of the spray shield to, if necessary, help direct or funnel portions of plants into a channel the spray shield defines, and a semi cylindrical portion extending from the end of the converging leading portion opposite the front end of the spray shield toward the rear end of the spray shield. The semi cylindrical portion has spaced opposite side parts joined by a central top part adapted to have means for suspending the spray shield from a support frame attached thereto, and has spaced generally parallel edges that help define the open side of the channel. Each of the side parts has an array of through openings with the openings in each array each disposed at a different distance from the adjacent edge, and means are provided for mounting a nozzle assembly in one of the through openings in each of the arrays to position nozzles in those assemblies with their outlet ends projecting from the inner surface of the spray shield to direct spray from the nozzles in generally opposite directions at desired locations and orientations relative to the edges and thereby to the plants along the rows. The top part also has an opening through which the third outlet nozzle assembly is mounted so that it projects from the inner surface of the spray shield and directs spray in generally at a right angle to the opposite directions in which spray from the nozzles in the side parts are directed, and the arrays and the central opening are spaced axially from each other along the longitudinal axis of the spray shield to restrict interference between liquid spray being discharged from the nozzles.

While the arrays of openings in the spray shield described in U.S. Pat. No. 4,947,581 advantageously afforded a variety of positions for the liquid spray sprayed into the spray shield, the axial orientations of the nozzles along the arrays are more dictated by the arcuate shape of the side parts than may be desired.

DISCLOSURE OF INVENTION

The present invention provides a spray shield structure for use in a spray shield assembly that, in addition to providing arrays of openings for spray nozzle assemblies along side walls of the spray shield, allows nozzles in those spray nozzle assemblies to be placed a plurality of pre-selected orientations with respect to the spray shield that are not dictated by the shape of the side walls to thereby provide the user of the spray shield with a selection of more desired spray patterns within the channel defined by the spray shield than has heretofore been obtainable.

According to the present invention there is provided an elongate polymeric spray shield adapted to be connected to a support frame moved over plants growing in spaced rows from the earth to temporarily enclose the plants. The spray shield has a longitudinal axis, axially spaced front and rear ends, and has an inner surface defining a channel opening through one side and its front and rear ends, in which channel the plants are temporarily positioned as the spray shield is moved over them. The spray shield comprises opposite arcuate side wall portions along its axis and at least one and preferably a plurality of nozzle anchor portions along each of the side wall portions. Each of the nozzle anchor portions is recessed from the side wall portion along which it is positioned toward the opposite side wall portion. Also, each of the nozzle anchor portions comprises a generally planar anchor part having generally parallel inner and outer surfaces, an outer edge portion joining one of the side wall portions and extending inwardly therefrom toward the other of the side wall portions, and has a generally centered through opening adapted to receive a liquid outlet nozzle assembly having axially spaced inlet and outlet ends, a nozzle at its outlet end, and means between its inlet and outlet ends adapted to releasably engage the opposite surfaces of the anchor part with the axis of the nozzle oriented at a right angle to the surfaces of the anchor part and the the nozzle adjacent the inner surface of the side wall portion. Each of the nozzle anchor portions also includes a conversion part extending around the inner edge of the anchor part opposite the side wall portion to which it is attached and extending from the that inner edge to the side wall portion in a direction generally opposite the open side of the channel to define a clearance area along the outer surface of spray shield adapted for receiving the inlet end of a nozzle assembly engaged in the anchor part and means for distributing liquid to it.

The spray shield further comprises an axially extending top wall portion between its side wall portions on its side opposite its open side, which top wall portion is adapted to have means attached thereto for suspending the spray shield from the support frame with its open side adjacent the earth; and preferably the plurality of nozzle anchor portions spaced along each of the side wall portions are disposed with the anchor parts of the nozzle anchor portions spaced different distances from the top portion, and having the generally parallel inner and outer surfaces of each of the nozzle anchor portions along each of the side wall portions disposed at a different angle with respect to an imaginary plane containing the longitudinal axis of the spray shield and bisecting the spray shield by passing centrally through the top portion and the open side of said spray shield.

Also, preferably the nozzle anchor portions are in pairs with each of the nozzle anchor portions in one of the pairs being on a different one of the opposite side wall portions, being spaced the same distance from opposite sides of the top portion, and having their generally parallel inner and outer surfaces disposed at the same angle with respect to the imaginary plane described above.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
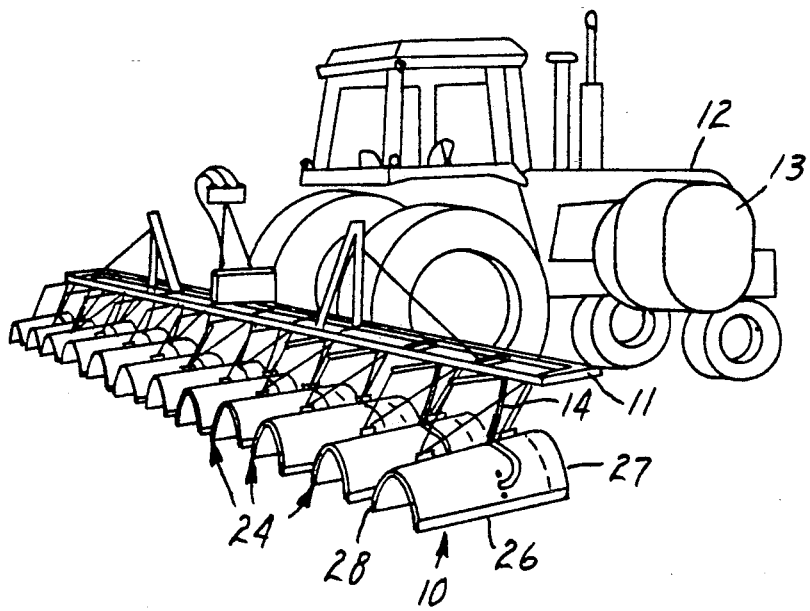
FIG. 1 is a perspective view of a plurality of spray shields according to the present invention shown in spray shield assemblies attached to a frame mounted on a tractor.
Figure 3:
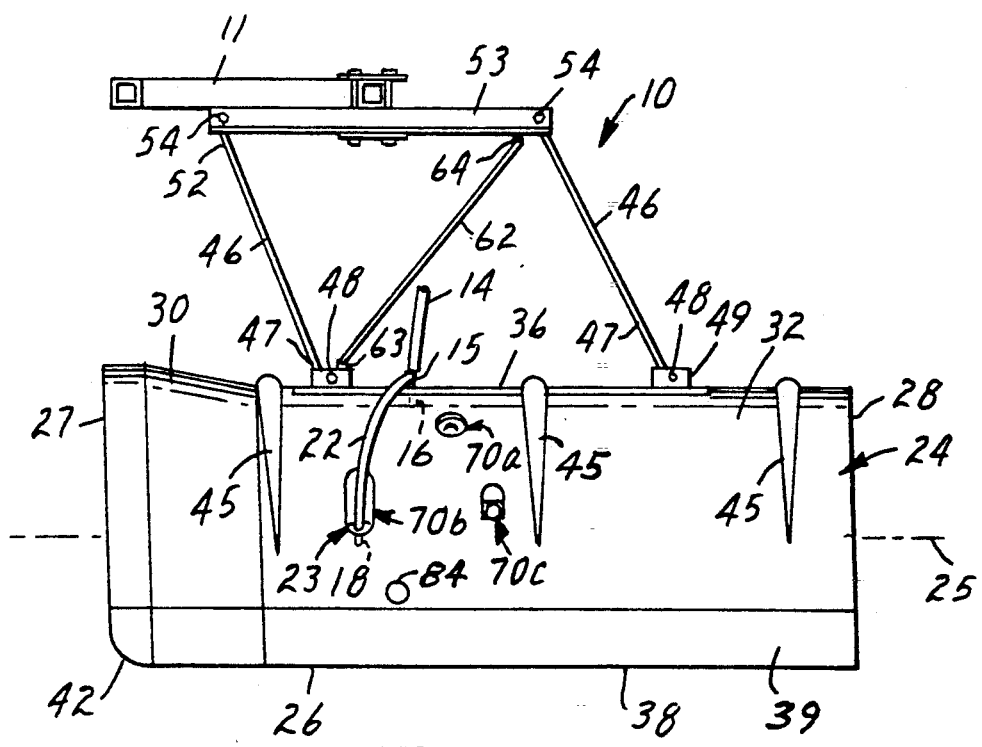
FIG. 3 is an opposite vertical side view of the spray shield assembly shown in FIG. 2.
Figure 4:
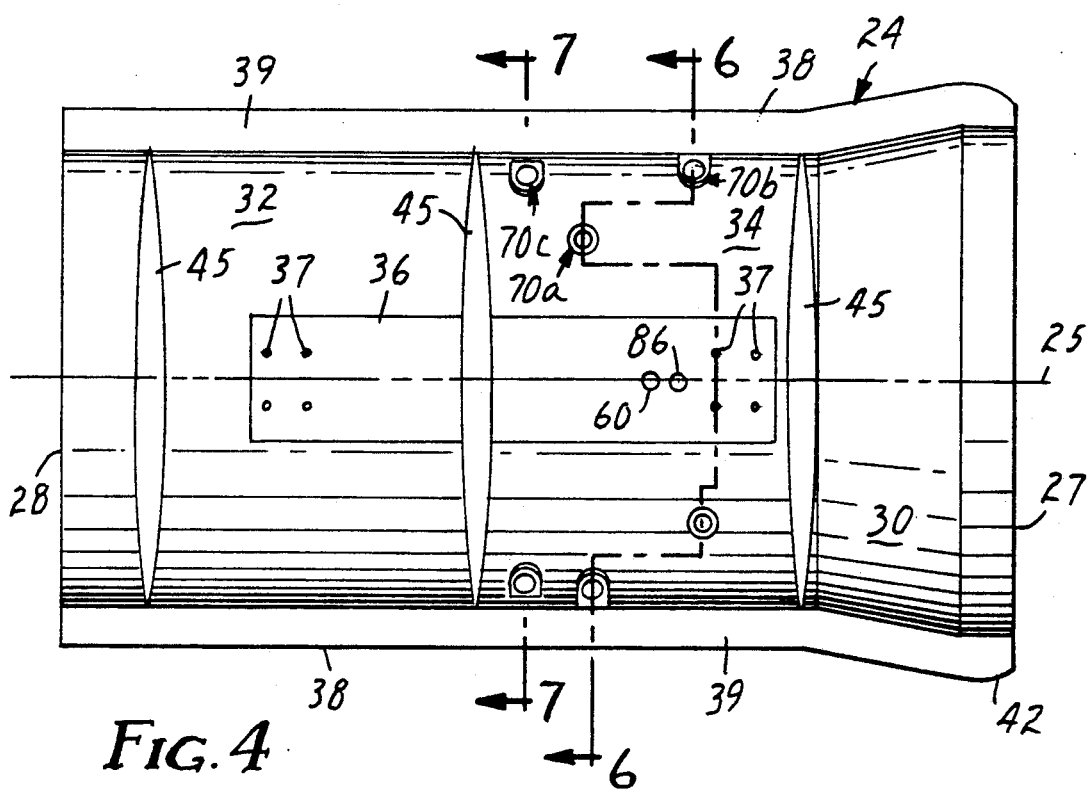
FIG. 4 is a top view of the spray shield included in the spray shield assembly shown in FIG. 2.
Figure 2:
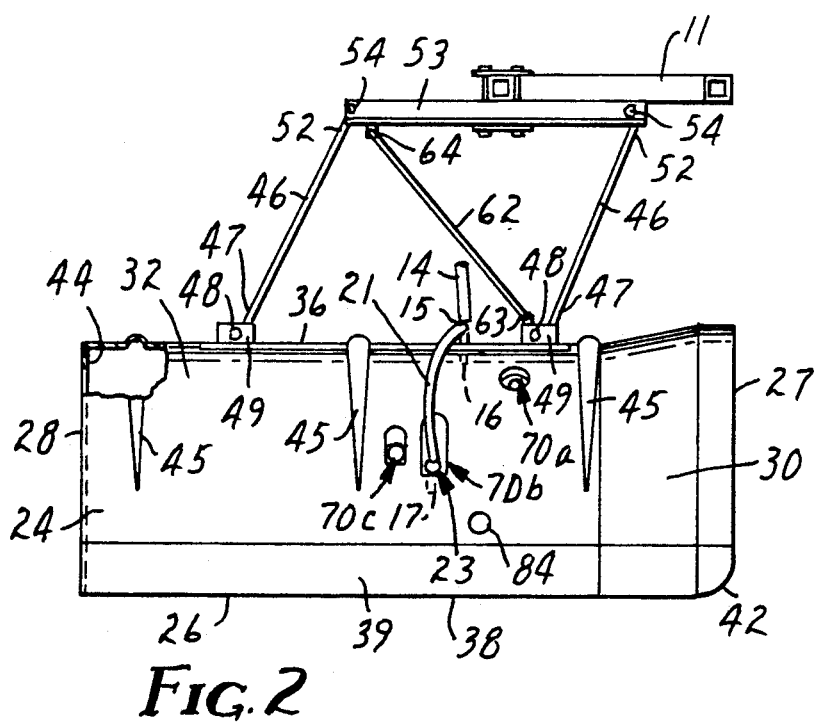
FIG. 2 is an enlarged vertical side view of one of the spray shield assemblies shown in FIG. 1.

Referring now to the drawings, there is shown in FIGS. 2 through 7 a spray shield 24 according to the present invention included in a spray shield assembly 10. FIG. 1 shows a plurality of such spray shield assemblies 10 attached to a frame 11 mounted on a tractor 12 in parallel positions in which the spray shields 24 can be moved by the tractor 12 over crops or plants planted in rows to temporarily enclose the crops or plants when liquids are sprayed onto them by a pumping system 13 carried by the tractor 12.

The spray shield assembly 10 comprises liquid distribution means including means for defining an inlet provided by one hose barb on a hollow four way connector 15 having three projecting hose barbs and a projecting male threaded portion (e.g., part No. T12C of nylon available from Precision Fitting and Valve, Eden Prairie, Minn.). The connector is adapted to be coupled by a hose 14 engaging a central one of its hose barbs to the pumping system 13 on the tractor 12 which provides a source of liquid under pressure. The liquid distribution means also includes at least two and preferably three liquid outlet nozzles 16, 17, and 18, (e.g., nozzles of the type provided under the trademark "TeeJet" by Spraying Systems Co., Wheaton, Ill.), and means for distributing liquid from the inlet at the connector 15 to the outlet nozzles 16, 17, and 18 including the four way connector 15 coupled to the nozzle 16 by a swivel nut 19 (e.g., part No. 8027 available from Precision Fitting and Valve, Eden Prairie, Minn.) around its threaded end portion and coupled by its hose barbs to hoses 21 and 22 connected between the connector 15 and hose barbs on hollow elbows 20. The hollow elbows 20 have radially outwardly extending flanges adjacent their hose barbs, and male threads around their end portions opposite their hose barbs (e.g., part No. NTL 12 of nylon available from Precision Fitting and Valve, Eden Prairie, Minn.) in which the the nozzles 17 and 18 are held by the swivel nuts 19. The elbows 20, nozzles 17 and 18 and swivel nuts 19 provide liquid outlet nozzle assemblies 23 each having inlet and outlet ends, and means provided by the flange on the elbows 20 and attaching nuts 29 around their threaded portions between their flanges and outlet ends adapted to releasably engage the opposite surfaces of the spray shield 24 around openings through the spray shield 24 receiving the elbows 20 with the axis of the nozzle 17 or 18 oriented at a right angle to the surfaces of the spray shield 24 around the opening and the outlet end of the nozzle adjacent the inner surface of the spray shield 24.

The spray shield 24 is elongate, has a generally U-shaped cross section and is made of generally uniformly thick resiliently flexible polymeric material 24 (e.g., made of about 0.48 centimeter or 3/16 inch thick polyethylene). The spray shield 24 is preferably made by spin or rotary molding to form two of the spray shields 24 together as a generally cylindrical part, and then cutting the spray shields 24 from each other, but could also be made by injection molding. The spray shield 24 has a longitudinal axis 25 and defines an axially extending channel opening through one open side 26 and front and rear axially spaced ends 27, 28 of the spray shield 24, in which channel the crops or plants are temporarily positioned as the spray shield 24 is moved over them. The spray shield 24 includes a leading portion 30 that converges axially from adjacent the front end 27 toward the rear end 28 of the spray shield 24 (e.g., at an angle in the range of about ten to twenty five degrees with respect to the axis 25) to, if necessary, help direct portions of plants into the channel; and a generally semi cylindrical portion 32 extending from the end of the leading portion 30 opposite the front end 27 of the spray shield 24 toward the rear end of the spray shield 24. The generally semi cylindrical portion 32 includes spaced opposite arcuate side wall portions 34 having opposed concave inner surfaces partially defining the inner surface of the spray shield 24 and convex outer surfaces partially defining the outer surface of the spray shield 24. The side wall portions 34 are joined at the top of the spray shield 24 by an elongate axially extending generally planer central top wall portion 36 adapted by having two patterns of four through openings 37 to have means (later to be explained) attached thereto by bolts for suspending the spray shield from the support frame 11 with the open side 26 of the channel adjacent the earth. The spray shield 24 has spaced generally parallel bottom edges 38 that define the open side 26 of the channel and are defined along narrow slightly outwardly turned flanges 39 along the sides of the side wall portions 34 opposite the top portion 36.

The spray shield 24 also includes a plurality of (three as illustrated) nozzle anchor portions 70a, 70b and 70c spaced along each of the side wall portions 34. The anchor portions 70a, 70b and 70c have generally the same parts, however those parts have different locations, sizes and orientations with respect to the top wall portion 36 and the side wall portions 34 to afford positioning the nozzle assemblies 23 at three different advantageous locations with respect to the inner surface of the spray shield 24. Each of the nozzle anchor portions 70a, 70b or 70c is recessed from the side wall portion 34 along which it is positioned toward the opposite side wall portion 34 and comprises a generally planar anchor part 72a, 72b or 72c having generally parallel inner and outer surfaces, and an outer edge portion joining one of the side wall portions 34 and extending inwardly therefrom toward the other of the side wall portions 34. The anchor part 72a, 72b or 72c has a generally centered through opening adapted to receive one of the liquid outlet nozzle assemblies 23 described above with the engagement means between the outlet and inlet ends releasably engaging the opposite surfaces of the anchor part 72a, 72b or 72c, with the axis of the nozzle 17 or 18 oriented at a right angle to the surfaces of the anchor part 72a, 72b or 72c, and with the outlet end of the nozzle 17 or 18 adjacent the inner surface of the side wall portion 34. Each of the nozzle anchor portions 70a, 70b or 70c also includes an arcuate conversion part 74a, 74b or 74c extending around the inner edge of the anchor part 72 opposite the side wall portion 34 from which it projects and extending from that inner edge to the side wall portion 34 from which it projects in a direction generally opposite the open side 26 of the spray shield 24 to define a clearance area along the outer surface of the spray shield 24 adapted for receiving the end of the hose 21 or 22 and the inlet end of one of the nozzle assemblies 23.

The nozzle anchor portions 70a, 70b or 70c are in three pairs with each of the nozzle anchor portions 70a, 70b or 70c in each of the pairs being on a different one of the opposite side wall portions 34. The nozzle anchor portions 70a or 70b in first and second pairs of the nozzle anchor portions are spaced generally the same distance from opposite sides of the top wall portion 36, are spaced axially of the spray shield 24 from each other and about equally on opposite sides of the through opening 60 in the top wall portion 36 through which projects the male threaded portion of the four way connector 15 on which the nozzle 16 is mounted to restrict interference with liquid spray being discharged from the nozzles 16, 17 and 18 mounted in the pair of nozzle anchor portions 70a or 70b and in the top wall portion 36, and have the generally parallel inner and outer surfaces of their anchor parts 72a or 72b disposed generally at the same angle with respect to an imaginary plane (illustrated by the dotted line 73) containing the axis 25 of the spray shield 24 and bisecting the spray shield 24 by passing centrally through the top wall portion 36 and the open side of the spray shield 24. The nozzle anchor portions 70c in a third pair of nozzle anchor portions are spaced generally the same distance from opposite sides of the top wall portion 36, are positioned generally opposite each other, and have the generally parallel inner and outer surfaces of their anchor parts 72c disposed generally at the same angle with respect to the imaginary spray shield bisecting plane 73 described above.

Figure 5:
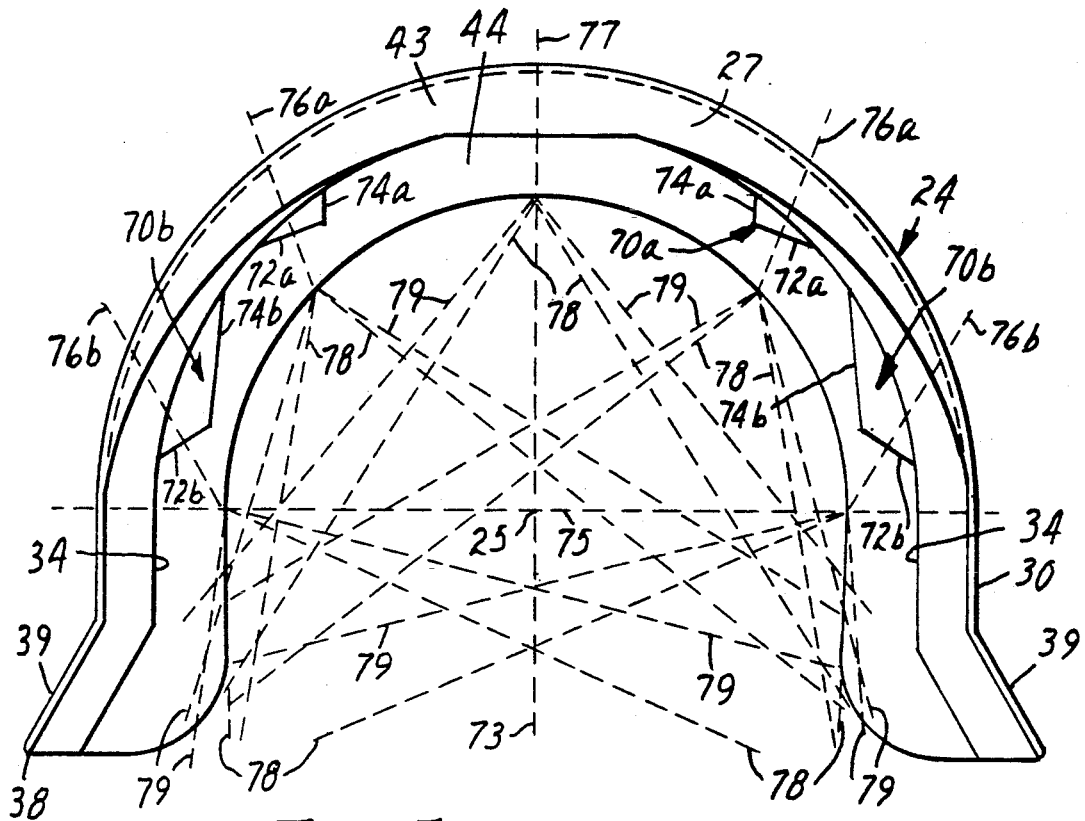
FIG. 5 is an enlarged front end view of the spray shield included in the spray shield assembly shown in FIG. 2 together with an indication by dotted lines of spray patterns that can be produced within the spray shield.
Figure 6:
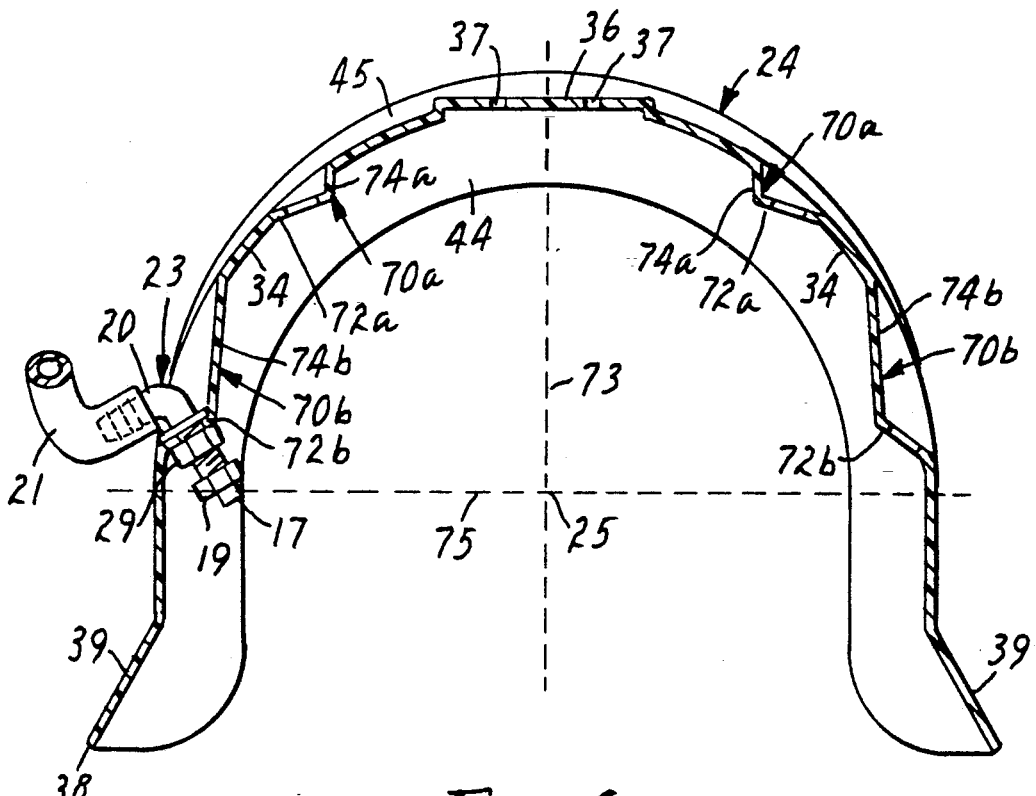
FIG. 6 is an enlarged sectional view taken approximately along line 6—6 of FIG. 4.
Figure 7:
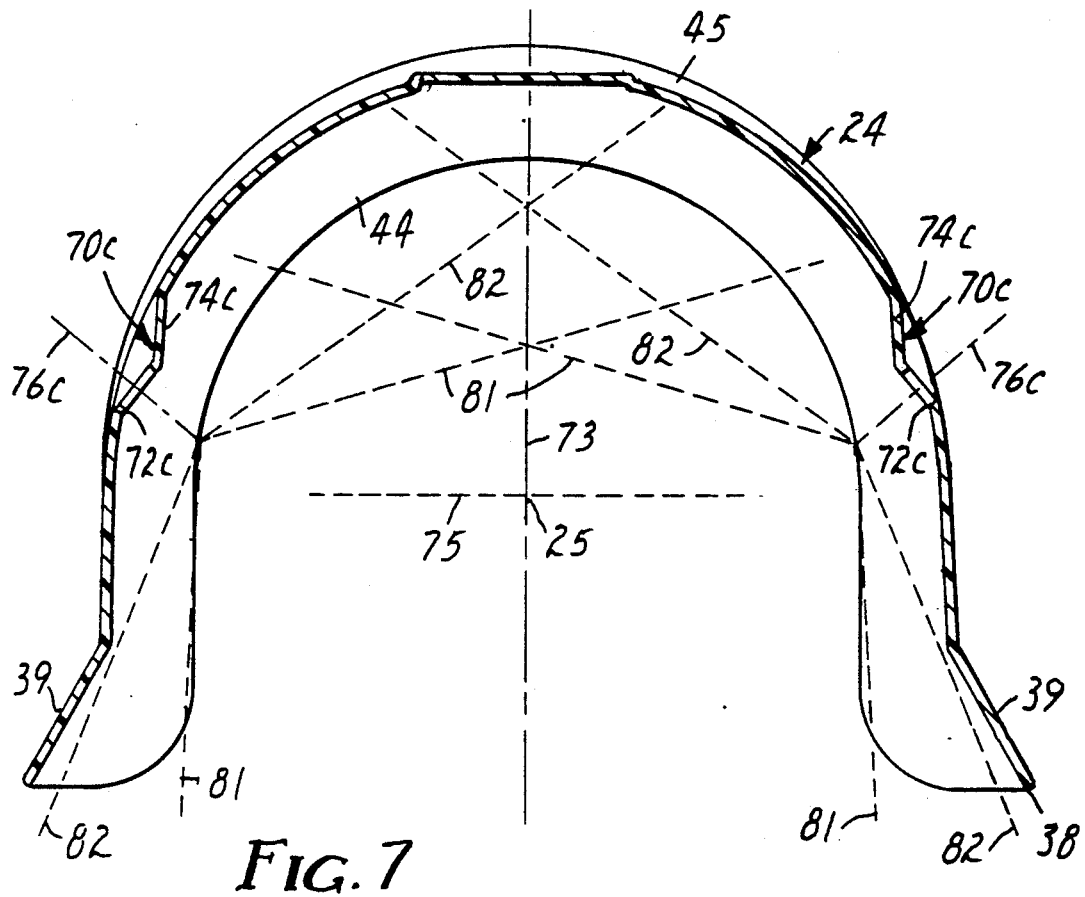
FIG. 7 is an enlarged sectional view taken approximately along line 7—7 of FIG. 4.
Figure 8:
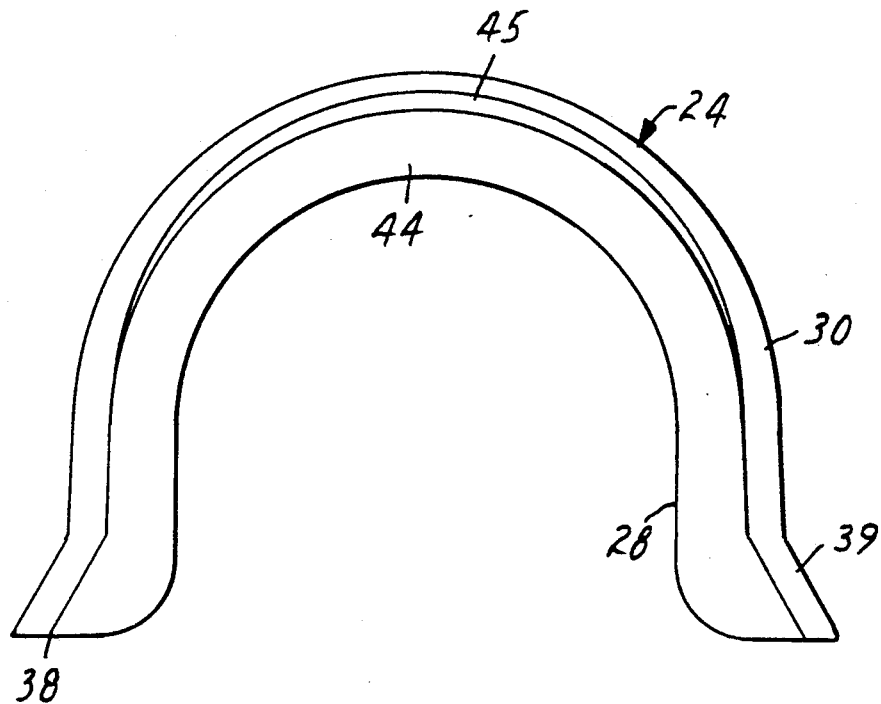
FIG. 8 is an enlarged rear end view of the spray shield included in the spray shield assembly shown in FIG. 2.

The following is one specific example of the location and orientation of the anchor parts 72a, 72b and 72c of the spray shield 24 when it is adapted for use on crop rows separated by between thirty to forty inches by having an overall axial length of about 35 inches and the outer surfaces of the arcuate opposite side wall portions 34 at a radius of about 8 inches or 20.3 centimeters about its axis 25. The anchor parts 72a in the first pair of nozzle anchor portions 70a have their inner and outer surfaces disposed parallel to the longitudinal axis 25 of the spray shield 24 and generally at an angle of about 69 degrees with respect to the imaginary spray shield bisecting plane 73 described above, with the centers of the through openings in the anchor parts 72a spaced about 4.99 inches or 12.69 centimeters from the imaginary spray shield bisecting plane 73 in opposite directions normal thereto, and spaced about 5.74 inches or 14.6 centimeters in a direction normal from a second imaginary plane (illustrated by the dotted line 75) that is normal to the imaginary spray shield bisecting plane 73 described above and passes through the axis 25 of the spray shield; the anchor parts 72b in the second pair of nozzle anchor portions 70b have their inner and outer surfaces disposed parallel to the longitudinal axis 25 of the spray shield 24 and generally at an angle of about 55 degrees with respect to the imaginary spray shield bisecting plane 73 described above, with the centers of the through openings in the anchor parts 72b spaced about 7.33 inches or 18.62 centimeters from the imaginary spray shield bisecting plane pane 73 in opposite directions normal thereto, and spaced about 1.36 inches or 3.5 centimeters in a direction normal from the second imaginary plane 75 described above; and the anchor parts 72c in the third pair of nozzle anchor portions 70c have their inner and outer surfaces disposed parallel to the longitudinal axis 25 of the spray shield 24 and generally at an angle of about 39 degrees with respect to the imaginary spray shield bisecting plane 73 described above, with the centers of the through openings in the anchor parts 72c spaced about 7.27 or 18.47 centimeters from the imaginary spray shield bisecting plane 73 described above in opposite directions normal thereto, and spaced about 2.14 inches or 5.4 centimeters in a direction normal from the second imaginary plane 75 described above. FIG. 5 illustrates dotted lines 76a and 76b that, for the above example of the location and orientation of the anchor parts 72a and 72b, represent the axes of the portions of the nozzle assemblies 23 mounted in the anchor part 72a and 72b respectively, dotted line 77 that represents the axis of the nozzle 16 mounted through the top wall portion 36, and diverging dotted patterns 78 and 79 originating at the outlet of the nozzles 16, 17 and 18 and respectively representing 65 degree and 80 degree patterns. As can be seen, using the nozzle assemblies 23 in the anchor parts 72a in combination with the nozzle 16 can provide a complete spray pattern that is particularly useful for spraying above the canape of row crops; whereas using the nozzle assemblies 23 in the anchor parts 72b in combination with the nozzle 16 can provide a complete spray pattern that is particularly useful for spraying both above and below the canape of row crops. FIG. 7 illustrates dotted lines 76c that represent the axes of the portions of nozzle assemblies 23 mounted in the anchor parts 72b, and diverging dotted patterns 81 and 82 originating at the outlet of the nozzles 17 and 18 and respectively representing 110 degree and 150 degree spray patterns. As can be seen, using the nozzle assemblies 23 in the anchor parts 72c even without the nozzle 16 in the top wall portion 36 can provide a complete spray pattern that is particularly useful for spraying insecticides generally uniformly over both sides of tall row crops. The outlet nozzles 17 or 18 can be mounted by the nozzle assemblies 23 in any one of an array of through openings including the through openings in the anchor parts 72 or through openings 84 in the side wall portions 34 along the second imaginary plane 75 described above to position the nozzles 17 and 18 with their outlet ends projecting from the inner surface of the spray shield 24 to direct spray from the nozzles 17 and 18 in generally opposite directions at desired orientations and locations relative to the edges 38 and thereby to the plants along the rows. The threaded end portions of the elbows 20 included in the nozzle assemblies 23 are held in those openings by flanges on the elbows 20 and the attaching nuts 39 (e.g., part No. B12 of nylon available from Precision Fitting and Valve, Eden Prairie, Minn.) engaging respectively the outer and inner surfaces of the spray shield 24. Either nozzle 17 or 18 can easily be relocated by removing the nozzle assembly 23 on which it is mounted from the opening in the anchor part 72 or side wall portion 34 in which it is mounted after removing the nut 19 and the nozzle 17 or 18, and then the attaching nut 29 threaded around the end portion of the elbows 20 that releasably retained the elbow 20 in that opening, and then again engaging the attaching nut 29, nozzle 17 or 18 and nut 19 after the elbow 20 is positioned in the desired different opening. Such relocation will change both the spacing of the nozzle 17 or 18 from the adjacent edge 38, and, because of the orientation of the anchor part 72 or side portion 34 through which it is mounted, change the orientation of the nozzle 17 or 18 to that desired by the user. The spray pattern from each nozzle 17 or can further be adapted as desired to the type of plant or location on the plant at which the spray is to be directed by selecting nozzle 16, 17, or 18 that provide different spray angles or spray patterns such as circular or fan like pattern, nozzles with such types of patterns being well known in the art and available from Spraying Systems Co., Wheaton, Ill. The top part 36 has the through opening 60 through which the threaded end portion of the connector 15 projects with the third outlet nozzle 16 mounted therein by the swivel nut 19 and its threaded end portion held in the spray shield 24 by an attaching nut 41 in the same manner described above for the elbows 20 so that the end portion of the nozzle 16 projects from the inner surface of the spray shield 24 and directs spray generally at a right angle to the top wall portion 36 equally on both sides of the imaginary bisecting plane 73 described above. The top part 36 also has a centered through opening 86 spaced a short distance axially of the spray shield 24 from the opening 60, through which opening 86 can be attached a single nozzle assembly that has essentially the same structure as the nozzle assembly 23, but which is attached directly to the hose 14. This allows the user to spray liquids from a single nozzle centered in the top wall portion 26, as may sometimes be desirable, without removing the connector 15 and the hoses 17 and 18 and nozzle assemblies 23 attached thereto. The end portion of the nozzle in that nozzle assembly attached in the opening 86 will project from the inner surface of the spray shield 24 and direct spray generally at a right angle to the top wall portion 36 equally on both sides of the imaginary bisecting plane 73 described above.

The converging leading portion 30 of the spray shield 24 has convex arcuate edges 42 extending from the edges 38 of the flanges 39 to the front end 27 of the spray shield 24 that provide arcuate cam surfaces (e.g., having radii in the range of about 1 to 2 inches), which cam surfaces diverge from the edges 38 toward the front end 27 along the leading portion 30 of the spray shield 24 so that they will both resiliently spread the flanges 39 of the spray shield 24 adjacent the arcuate edges 42 and will lift the spray shield 24 upon engagement of the arcuate edges or cam surfaces 42 with an obstacle on the earth, thereby minimizing the impact on the spray shield 24 caused by such engagement.

The spray shield 24 has a crescent shaped flange 43 projecting radially inwardly at the front end 27 of the spray shield 24, an arcuate flange 44 projecting radially inwardly at the rear end 28 of the spray shield 24, and three arcuate ribs 45 spaced along its axis 25, which flanges 43 and 44 and ribs 45 restrict spreading of its opposite sides and thereby help retain the shape of the spray shield 24 and minimize vibration in the spray shield 24 when it is in use.

Suspension means are also provided that are adapted for suspending the spray shield 24 from the frame 11. The suspension means comprises two rigid bars 46 having first ends 47 mounted in spaced clevises 49 bolted through the openings 37 to the spray shield 24 along the outer surface of its top wall portion 36 adjacent its front and rear ends 27 and 28 respectively. The first ends 47 of the bars are mounted for pivotal movement about pivot axes defined by bolts or pins 48 that extend through the bars 46 and clevises 49 normal to the axis 25 of the spray shield 24 and generally parallel to a plane defined by the edges 38 on the spray shield 24. Second ends 52 of the bars 46 opposite their first ends 47 are mounted between two parallel angle brackets 53 extending axially of the spray shield 24 and attached to the frame 11 for pivotal movement about an axes defined by pins or bolts 54 through the brackets 53 and bars 46 parallel to the pivot axis defined by the pins 48. Also included in the suspension means is a resiliently elastic member 62 having a first end 63 fastened to the pin 48 at the first end 47 of the bar 46 adjacent the front end 27 of the spray shield 24 and an opposite second end 64 attached to one of the brackets 53 adjacent the second end 52 of the bar 46 adjacent the rear end 28 of the spray shield 24. The elastic member 62 is stretched to provide tension between its points of attachment. The lengths of the bars 46 and elastic member 62 and the tension that can be applied by the elastic member 62 upon stretching are selected and adapted so that the resiliently elastic member 60 normally positions the bars 46 so that straight lines extending through the axes defined by the pins 48 and 54 about which the ends 47 and 52 of the bars 46 pivot and intersecting the longitudinal axis 25 of the spray shield 24 will define an acute angle on the side of that intersection adjacent the front end 27 of the spray shield 24. (e.g., an acute angle of about 60 degrees). With that arrangement, engagement of the arcuate edges 42 at the front end 27 of the spray shield 24 with an object or the ground will cause the spray shield 24 to move upward and rearward relative to the brackets 53 and frame 11 against the bias normally provided by its weight due to pivoting of the bars 46 about the axes defined by the bolts 48 and 54, thereby decreasing the acute angle described above, after which the shield will again return to its normal position under the influence of its weight.

The present invention has now been described with reference to one embodiment thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

We claim:

1. A an elongate polymeric spray shield adapted to be connected to a support frame moved over plants growing in spaced rows from the earth to temporarily enclose the plants, said spray shield having an longitudinal axis, axially spaced front and rear ends, and having an inner surface defining a channel opening through an open side and said front and rear ends of the spray shield, in which channel the plants are temporarily positioned as the spray shield is moved over them with the open side of the channel adjacent the earth, said spray shield comprising opposite arcuate side wall portions along said axis having opposed concave inner surfaces defining opposite portions of said inner surface, and at least one nozzle anchor portion along each of said side wall portions, each of the nozzle anchor portions being recessed from the side wall portion along which it is positioned toward the opposite side wall portion and comprising a generally planar anchor part having generally parallel inner and outer surfaces, an outer edge portion joining one of said side wall portions and extending inwardly therefrom toward the other of said side wall portions, said anchor part having a generally centered through opening adapted to receive a liquid outlet nozzle assembly of the type including a tubular member, axially spaced inlet and outlet ends, a nozzle at said outlet end, and means between said outlet and inlet ends adapted to releasably engage the opposite surfaces of the anchor part with the axis of the nozzle oriented at a right angle to the surfaces of the anchor part and the outlet end of the nozzle adjacent the inner surface of the side wall portion, and a conversion part extending around the inner edge of the anchor part opposite the side wall portion and extending from the said inner edge to the side wall portion in a direction generally opposite the open side of said channel to define a clearance area along the outer surface of spray shield adapted for receiving the inlet end of a nozzle assembly engaged in the anchor part and means for distributing liquid to the inlet end of that nozzle assembly.

2. A An elongate polymeric spray shield according to claim 1 wherein said spray shield further comprises an axially extending top wall portion between said side wall portions on the side of said spray shield opposite said open side, said top wall portion being adapted to have means attached thereto for suspending the spray shield from the support frame with said open side adjacent the earth; and a plurality of said nozzle anchor portions spaced along each of said side portions, said nozzle anchor portions being disposed with the anchor parts of said nozzle anchor portions spaced different distances from said top portion, and having the generally parallel inner and outer surfaces of each of said nozzle anchor portions along each of said side wall portions disposed at a different angle with respect to an imaginary plane containing said axis and bisecting the spray shield by passing centrally through said top portion and the open side of said spray shield.

3. A spray shield according to claim 2 wherein said nozzle anchor portions are in pairs with each of said nozzle anchor portions in one of said pairs being on a different one of said opposite side wall portions, being spaced the same distance from opposite sides of said top portion, and having their generally parallel inner and outer surfaces disposed at the same angle with respect to said imaginary plane.

4. A spray shield according to claim 3 wherein the relationships of the anchor parts in the pairs of nozzle anchor portions are selected from the group of relationships consisting of (a) having their inner and outer surfaces disposed generally at an angle of about 69 degrees with respect to said imaginary plane and having the centers of said through openings in said anchor parts spaced normally in opposite directions about 5 inches or 12.7 centimeters from said imaginary plane, (b) having their inner and outer surfaces disposed generally at an angle of about 55 degrees with respect to said imaginary plane and having the centers of said through openings in said anchor parts spaced normally in opposite directions about 7.3 inches or 18.6 centimeters from said imaginary plane, and (c) having their inner and outer surfaces disposed generally at an angle of about 39 degrees with respect to said imaginary plane and having the centers of said through openings in said anchor parts spaced normally in opposite directions about 7.3 inches or 18.5 centimeters from said imaginary plane.

5. A an elongate polymeric spray shield according to claim 1 wherein said spray shield further comprises an axially extending top wall portion between said side wall portions on the side of said spray shield opposite said open side, said top wall portion being adapted to have means attached thereto for suspending the spray shield from the support frame with said open side adjacent the earth and having a through opening adapted to receive a liquid outlet nozzle assembly of the type having an axis, axially spaced inlet and outlet ends, a nozzle at said outlet end, and means between said inlet and outlet ends adapted to releasably engage the opposite surfaces of the top wall portion with the axis at the nozzle oriented at a right angle to the surfaces of the top wall portion and the outlet end of the nozzle adjacent the inner surface of the spray shield; and three of said nozzle anchor portions spaced along each of said side portions with the anchor parts of said nozzle anchor portions along each of said side portions spaced along said axis and spaced different distances from said top wall portion, and having the generally parallel inner and outer surfaces of each of said nozzle anchor portions along each of said side wall portions disposed at a different angle with respect to an imaginary plane containing said axis and bisecting the spray shield by passing centrally through said top portion and the open side of said spray shield.

6. A spray shield according to claim 5 wherein said nozzle anchor portions are in three pairs with each of said nozzle anchor portions in each of said pairs being on a different one of said opposite side wall portions, said nozzle anchor portions in two of said pairs being spaced generally the same distance from opposite sides of said top portion, being spaced axially of said spray shield from each other and equally on opposite sides of said through opening in said top wall portion to restrict interference with liquid spray being discharged from nozzle assemblies mounted in the pair of nozzle anchor portions and in the top wall portion, and having their generally parallel inner and outer surfaces disposed generally at the same angle with respect to said imaginary plane, and said nozzle anchor portions in one of said pairs being spaced generally the same distance from opposite sides of said top portion, being positioned generally opposite each other, and having their generally parallel inner and outer surfaces disposed generally at the same angle with respect to said imaginary plane.

7. A spray shield according to claim 6 wherein the anchor parts in a first pair of said three pairs of nozzle anchor portions have their inner and outer surfaces disposed parallel to the longitudinal axis of said spray shield and generally at an angle of about 69 degrees with respect to said imaginary plane and the centers of said through openings in said anchor parts are spaced about 5 inches or 12.7 centimeters from said imaginary plane; the anchor parts in a second pair of said three pairs of nozzle anchor portions have their inner and outer surfaces disposed parallel to the longitudinal axis of said spray shield and generally at an angle of about 55 degrees with respect to said imaginary plane and the centers of said through openings in said anchor parts are spaced about 7.3 inches or 18.6 centimeters from said imaginary plane; and the anchor parts in a third pair of said three pairs of nozzle anchor portions have their inner and outer surfaces disposed parallel to the longitudinal axis of said spray shield and generally at an angle of about 39 degrees with respect to said imaginary plane and the centers of said through openings in said anchor parts are spaced in opposite directions about 7.3 inches or 18.5 centimeters from said imaginary plane.

8. A spray shield assembly according to claim 1 wherein said spray shield is spin molded of polypropylene and has a generally uniform thickness between said inner and outer surfaces of about 0.48 centimeter (3/16 inch).

* * * * *